A. R. HAVENER.
MACHINE FOR SETTING RIVETS.
APPLICATION FILED APR. 20, 1908.

931,062.

Patented Aug. 17, 1909.
5 SHEETS—SHEET 5.

Witnesses.
Sydney E. Taft.
Francis H. Bishop.

Inventor.
Arthur R. Havener,
by his attorney,
Charles S. Gooding.

UNITED STATES PATENT OFFICE.

ARTHUR R. HAVENER, OF WALTHAM, MASSACHUSETTS, ASSIGNOR TO JUDSON L. THOMSON MFG. CO., A CORPORATION OF MAINE.

MACHINE FOR SETTING RIVETS.

No. 931,062.      Specification of Letters Patent.      Patented Aug. 17, 1909.

Application filed April 20, 1908. Serial No. 427,993.

*To all whom it may concern:*

Be it known that I, ARTHUR R. HAVENER, a citizen of the United States, residing at Waltham, in the county of Middlesex and State of Massachusetts, have invented new and useful Improvements in Machines for Setting Rivets, of which the following is a specification.

This invention relates to a machine for setting rivets in sheet material and is particularly adapted to set rivets in the leather covers of automobile tires, such rivets having preferably a corrugated and enlarged head which prevents the tire from skidding or slipping. The machine is so arranged and constructed that a series of rows of rivets may be driven in the leather cover of the tire, and these rows of rivets are preferably arranged with the rivets in every other row in lateral alinement with each other, the remaining rows of rivets arranged with the rivets in lateral alinement with the space between the rivets of the rows adjacent thereto, thus covering the largest possible amount of surface of the leather tire cover with said rivets and exposing a large area of rivets which constitutes a nonskidding and a long wearing surface or armor for the tire cover.

The invention consists essentially in the mechanism by which the leather cover of the tire is fed into proper position relatively to the driver of any suitable riveting machine, so that the rivets may be inserted in the leather cover of the tire in the manner hereinbefore set forth.

The invention further consists in the combination and arrangement of parts set forth in the following specification and particularly pointed out in the claims thereof.

Referring to the drawings.

In Figs. 1, 2 and 4, the several parts of the mechanism are in the relative positions assumed thereby when the first row of rivets is being driven in the material; in Fig. 3 the parts are in the several positions assumed thereby when the second row of rivets is being driven.

Like numerals refer to like parts throughout the several views of the drawings.

In the drawings, the riveting machine consists of a frame 15 supported upon a suitable column 16. The rivets are deposited in a hopper 17 from which they are fed down a raceway to a carrier 19. The rivets in the hopper are separated and fed to the raceway by means of a suitable rotary device which is driven by a pulley 20, said pulley being rotated by means of a belt 21 driven by a pulley 22, said pulley being fast to a shaft 23 to which a gear 24 is attached, the gear 24 being driven by a pinion 25 fast to the main driving shaft 26, which main driving shaft is rotated by means of a pulley 27. The rivet 28 (Fig. 6) passes from the raceway 18 between the carrier plates $19'$ and $19^2$. A guide-finger 29 projects between the carrier plates $19'$ and $19^2$ and between the legs of the bifurcated rivet, said guide-finger being pivoted at 30 (Fig. 2) to a carrier slide 34. A spring 32 holds the guide-finger 29 in the position indicated in Fig. 1. The carrier plates $19'$ and $19^2$ are fastened to springs 33, 33, which, in turn, are fastened to the carrier slide 34. Said carrier slide is adapted to slide in suitable ways in the head of the machine and is held upwardly or in the position illustrated in the drawings by a light spiral spring 35.

The driver 36 is fastened to a driver slide 37 (adapted to slide in ways in the frame of the machine) to which a reciprocatory motion is imparted by toggle-links 38, 38 which are connected by a rod 39 to a crank-pin 40 fast to a cam-plate 41 which, in turn, is rigidly fastened to the shaft 23.

Figure 1:
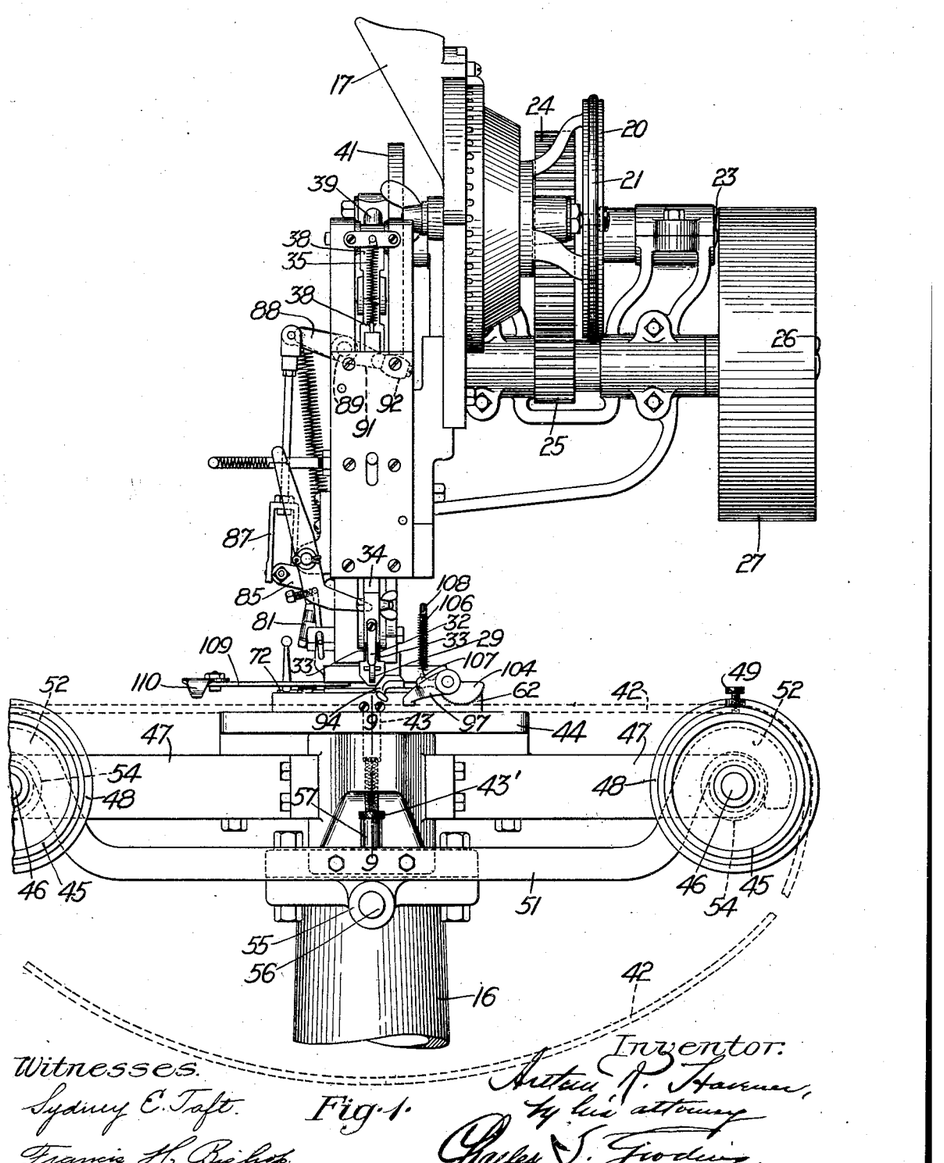
Figure 1 is a front elevation of my improved riveting machine, partly broken away to save space.
Figure 2:
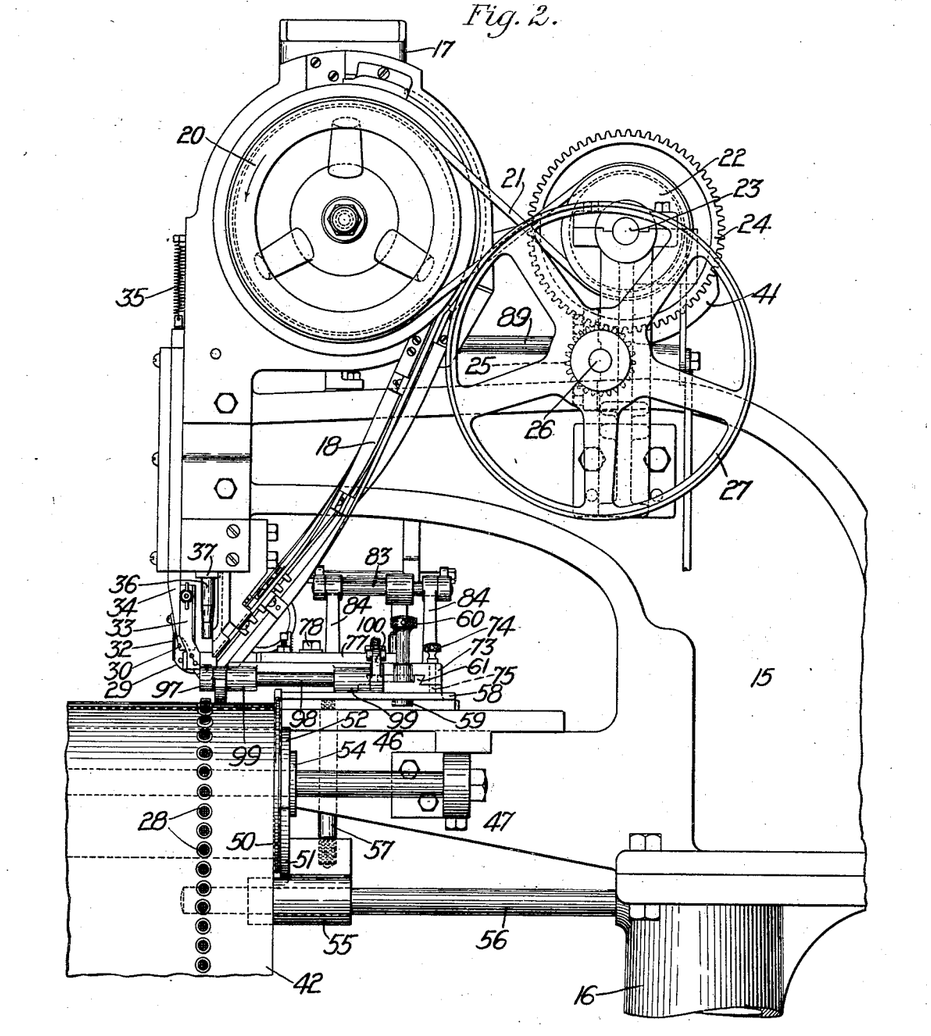
Fig. 2 is a right hand side elevation of the same, partly broken away, a portion of a tire covering, with the first row of rivets set therein, being shown in connection with the machine.
Figures 6, 7, 8, 9, 10:
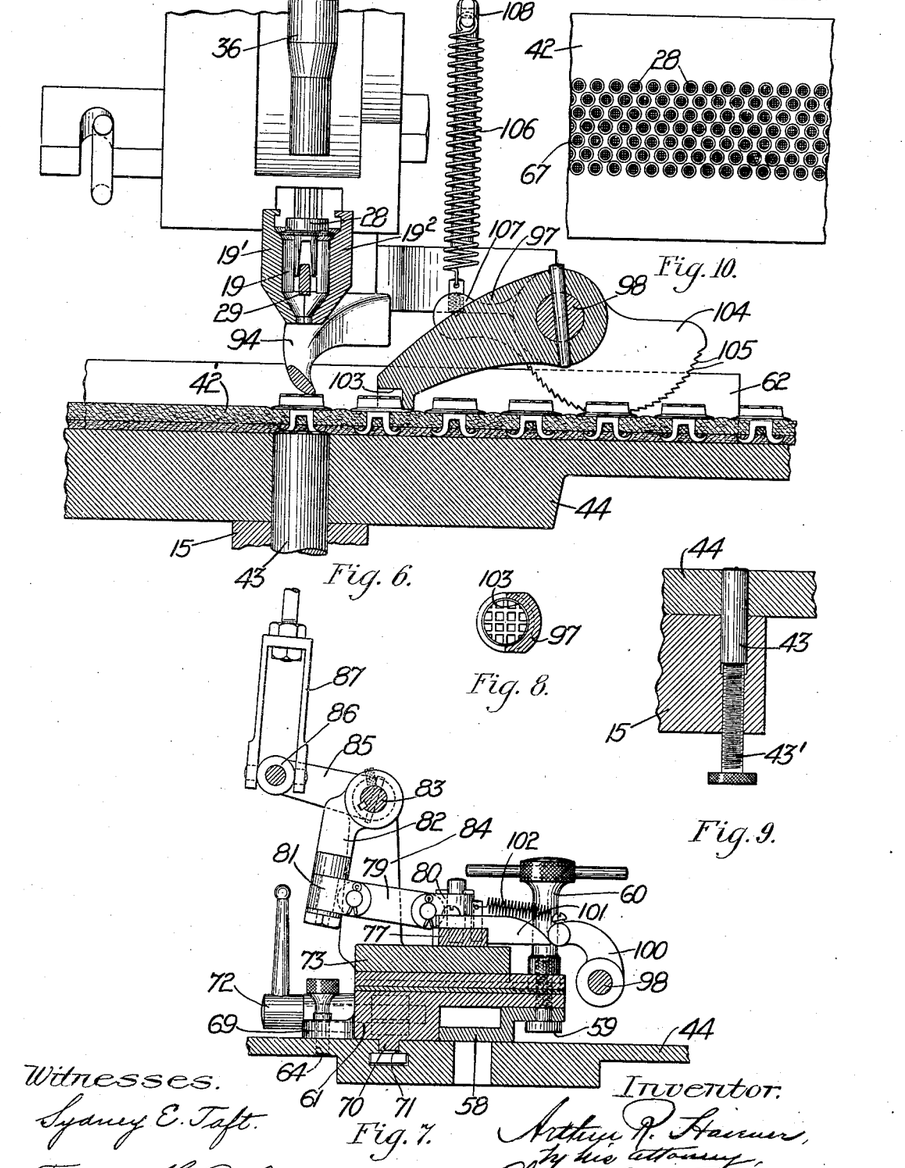
Fig. 6 is a sectional elevation taken on line 6—6 of Fig. 4.
Fig. 7 is a sectional elevation taken on line 7—7 of Fig. 4.
Fig. 8 is a detail section taken on line 8—8 of Fig. 6, a rivet being shown in plan view in connection therewith.
Fig. 9 is a detail sectional elevation taken on line 9—9 of Fig. 1, illustrating the anvil adjustment.
Fig. 10 is a plan view of a portion of a tire cover with the rivets driven therein.

The operation of the rivet setting mechanism hereinbefore specifically described is as follows: Assuming the rivet 28 to be in the position illustrated in Fig. 6, the driver 36 descends and drives said rivet downwardly, together with the carrier 19, and when the carrier has descended to such a point that the plates 19' and 19² rest at their lower ends against the upper surface of the tire cover, upon a further downward motion of the driver 36, the guide-finger 29 moves outwardly from between the legs of the rivet and the plates 19' and 19² are forced apart by the head of the rivet, which rivet is then driven downwardly through the sheet material or tire cover 42 and riveted therein against an anvil 43, (as illustrated in Fig. 6,) which projects upwardly through a base-plate 44 and is adjusted by means of a screw 43' which has screw-threaded engagement with the frame 15 (Fig. 9). The base-plate 44 is rigidly fastened to the frame 15 and forms a support for the feeding mechanism and also forms a support for the sheet material or tire cover 42, which extends across said support in the form of an endless belt and around the guide-rolls 45, 45, as indicated in dotted lines (Fig. 1). Said guide-rolls are each journaled to rotate upon studs 46, 46 fast to brackets 47, 47, which brackets are fastened to the frame of the machine. The guide-rolls 45 form a part of the feeding mechanism and are rotatably mounted upon the studs 46 and are also slidably mounted thereon. Each of said guide-rolls has a guide-flange 48 adjustably attached thereto by means of a set-screw 49. The inner end of each of the guide-rolls 45 is provided with a flange 50. The guide-rolls 45, 45 may be adjusted longitudinally of the studs 46, by means of a yoke 51 which is provided at its opposite ends with hooks 52, 52 adapted to project into annular grooves 53, 53 formed in the hubs 54, 54 of said guide-rolls.

The yoke 51 is fastened to a slide bracket 55 adapted to slide longitudinally of a stud 56 fast to the column 16. Said slide bracket 55 is moved upon the stud 56 by means of a vertical stud 57 which is fastened at its upper end to a Z-shaped plate 58 which, in turn, is fastened by a clamp-stud 59 and nut 60 to a slide 61. The Z-shaped plate 58 has a vertical flange 62 fast thereto which rests along its lower edge upon the base-plate 44 and forms a guide for the edge of the belt or tire cover between the two guide-rolls 45, 45, said edge guide being in alinement with the flanges 50 upon said guide-rolls. The flanges 48 upon said guide-rolls may be adjusted to any point upon the rolls to accommodate different widths of the belt or tire cover which is to have the rivets driven therein. The clamp-stud 59 projects through a slot 63 in the Z-shaped plate 58, so that by loosening the clamp-nut 60 the stud 59 may be moved longitudinally of the slot 63 and thus the Z-shaped plate will be moved, together with its vertical flange 62, longitudinally of the rolls 45. At the same time that this adjustment takes place the Z-shaped plate will move the stud 57 which is fast thereto, also the slide bracket 55 and the yoke 51, so that the rolls 45, 45 will be moved longitudinally of the studs 46 and thus the flanges 50 on said rolls will be kept in alinement with the vertical guide flange 62. These adjustments for the edge guides for the belt or cover are made in order to locate the belt in the proper location relatively to the driver—that is, so that the first row of rivets 28 (Fig. 10) shall be driven at the correct distance from the inner edge of the tire cover 42.

Figure 4:
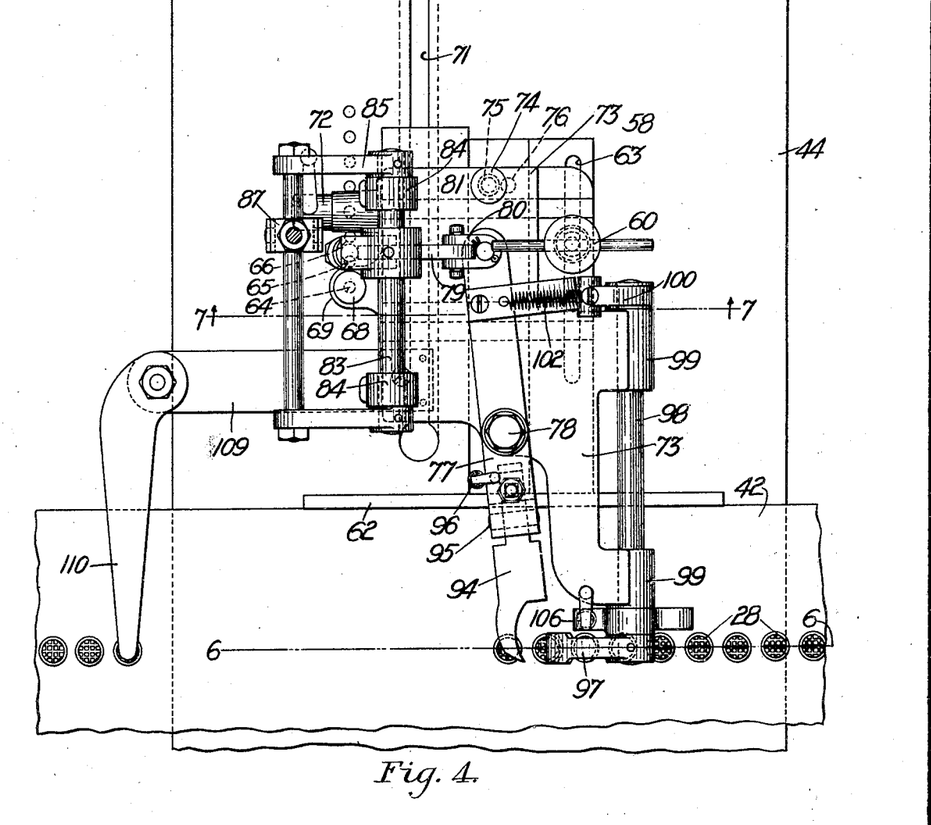
Fig. 4 is a plan view of the feeding mechanism showing in connection therewith a portion of a tire covering, with a portion of the first row of rivets set therein.

In order to adjust the tire cover laterally thereof, so that subsequent rows of rivets may be driven therein at the correct lateral distance apart, a series of holes 64, 65, 66 et cetera are provided in the base-plate 44 (see Figs. 4 and 7), and after the first row of rivets has been driven in the tire cover, as hereinafter described, the third row 67 (Fig. 10) is driven therein, and the tire cover set relatively to the driver in order to drive said third row in the proper location by removing the thumb-pin 68 (Fig. 4) from the hole 64, then moving the slide 61 backwardly and inserting the pin 68 in the hole 66, it being noted that the pin 68 extends through a hole provided in an ear 69 on the slide 61. When the slide 61 is moved backwardly, as described, it will be evident that the edge gage 62 and the guide-rolls 45, 45 will be moved a corresponding distance, thus carrying the belt or tire cover into the proper position laterally to have the rivets 67 driven to make the third row of rivets. Following alternate rows may be driven in the tire cover according to the number of rows that is desired by repeating the adjustment of the slide 61, hereinbefore described, and inserting the pin 68 in the proper hole in the base-plate 44. The slide 61 is guided by a tongue 70 upon the lower side thereof which projects into a slot 71 constituting a guide-way and formed in the base-plate 44 (Fig. 4). Said slide 61 is still further securely clamped to the base-plate 44 by a clamp-screw 72.

The tire cover 42 is fed longitudinally thereof, in order to space the rivets at the desired distance apart, by means of feeding mechanism which is mounted upon a slide 73, which slide is movable upon ways provided upon the slide 61. When the first, third, fifth and other alternate rows of rivets are being driven in the tire cover 42, the thumb-pin 74 extends through the slide 73 and projects into a hole 75 in the lower slide 61. When the second, fourth, sixth, and corresponding alternate rows are being driven, the thumb-pin 74 will be located in the hole 76 in the lower slide 61, the upper slide being moved toward the right (Fig. 4) sufficiently to allow said thumb-pin to be inserted in the hole 76. This sidewise adjustment of the upper slide 73 is for the purpose of locating the rivets in rows 2, 4, 6, et cetera, in lateral alinement with the space between the rivets in rows 1, 3, 5 et cetera, to break joints with said rivets for the purpose hereinbefore set forth.

Figure 3:
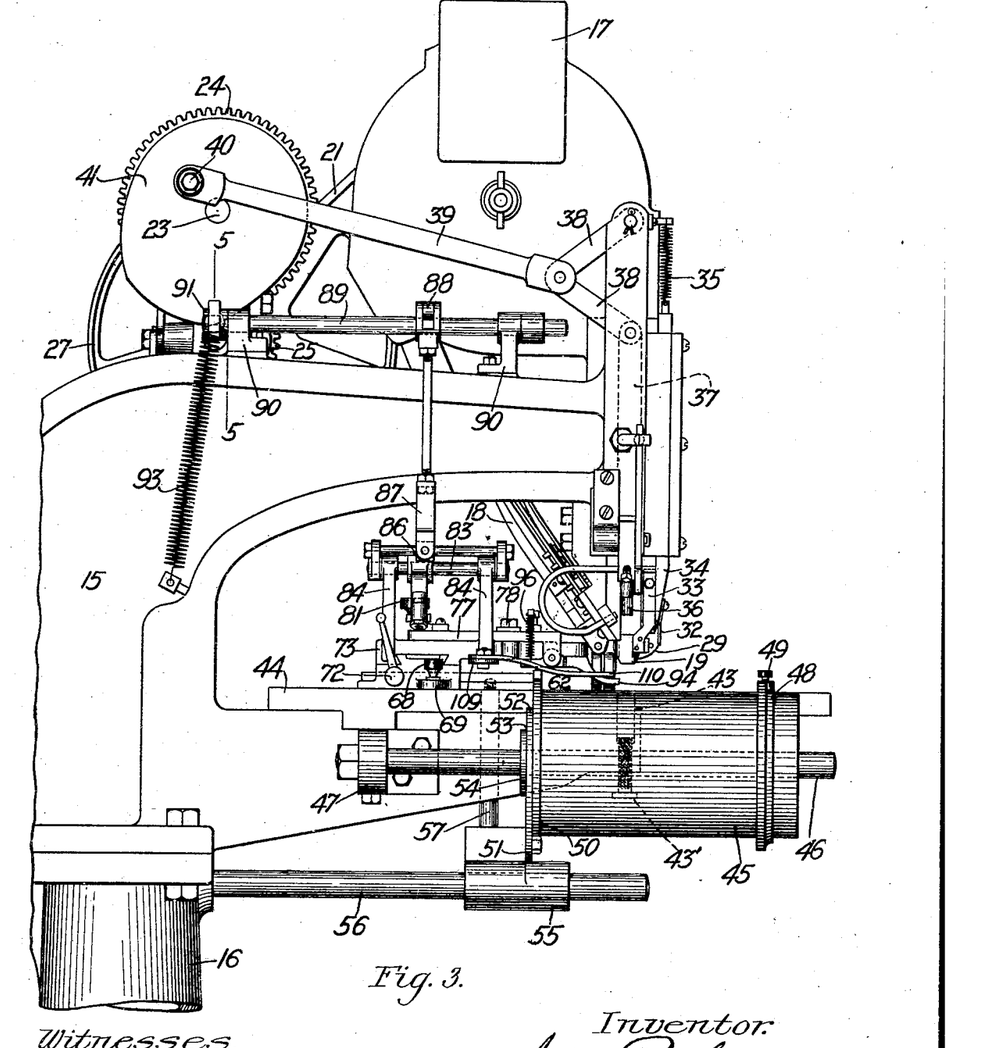
Fig. 3 is a left hand side elevation of the same, partly broken away.
Figure 5:
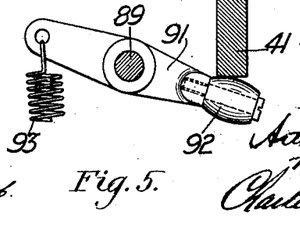
Fig. 5 is a detail sectional elevation taken on line 5—5 of Fig. 3.

The tire cover 42 is fed longitudinally thereof, in order to have the rivets set therein at the correct space apart, by a lever 77, pivoted at 78 to the upper slide 73. A rocking motion is imparted to the lever 77 by a link 79 which is pivotally connected at one end to the swivel block 80 upon the lever 77 and at the other end thereof to another swivel block 81 (Fig. 7) connected to the lower end of an arm 82 which is fast to a rock-shaft 83 mounted upon standards 84, 84 upon the upper slide 73. A rocking motion is imparted to the rock-shaft 83 by a rocker-frame 85 which is connected by a swivel block 86 to the lower end of a link 87, the upper end of which link is connected to an arm 88 fast to a rock-shaft 89 mounted to rock in brackets 90, 90 fast to the frame of the machine. The rock-shaft 89 has a rocking motion imparted thereto by a cam lever 91 (Fig. 5) which is actuated by the cam plate 41 fast to the shaft 23. The cam roll 92 engages the cam plate 41 and is held in engagement therewith by means of a spring 93. The free end of the lever 77 has a feed-finger 94 pivoted thereto by means of a pin 95 and said feed finger is pressed downwardly upon the tire cover 42 by a spring 96 (Figs. 3 and 4) so that as the lever 77 is rocked upon its pivot the feed finger 94 may be moved along the surface of the material and slide over the rivet head in its backward movement and then descend upon the material, so that when it is moved forward again it will engage the rivet to feed the material longitudinally thereof and relatively to the driver. A stop 97, against which the rivet is fed by the feed finger and the lever to which said feed finger is pivoted, is fastened to a rock-shaft 98 (Figs. 4 and 6) and this rock-shaft is mounted in bearings 99, 99 upon the upper slide 73. A rocking motion is imparted to the rock-shaft 98 in order to lift the stop 97 from the material 42 by an arm 100 fast thereto and adapted to be engaged by a cam-shaped finger 101 fast to the lever 77. Said stop is held downwardly in contact with said material by a spring 102, one end thereof fast to said arm 100, the other end thereof fast to the cam-shaped finger 101. The stop 97 has a U-shaped recess 103 provided in the free end thereof into which the rivets 28 are fed consecutively by the feed finger. When the feed finger 94 has moved backwardly over the work, in readiness to feed the material forward again, it drags over the head of one of the rivets and naturally tends to pull the material backwardly or toward the left (Fig. 6), and to overcome this tendency a presser-foot 104 is provided, which is pivotally mounted upon the rock-shaft 98 and has corrugations 105 upon the periphery thereof. The presser-foot 104 is eccentrically mounted upon the rock-shaft 98 and its corrugated periphery is held in engagement with the material 42 by a spring 106, one end of which is fastened to an arm 107 upon the presser foot 104, the opposite end thereof being fastened to a pin 108 fast to the upper slide 73. The upper slide 73 has a bracket 109 rigidly fastened thereto and to this bracket is adjustably fastened a gage finger 110 adapted to project forward over the material and aline with the rivets in the first row of rivets, the object of this gage finger being to assist the operator in setting the last few rivets in each row in their proper location, as hereinafter described.

Having thus specifically described my invention, I will proceed to describe the general operation of the same: Assuming the parts to be in the position illustrated in Figs. 1 and 2, and it is desired to drive the first row of rivets in the material, the operator first sets the tire cover laterally thereof in the proper position for the rivet to be driven at the desired distance from the inner edge of said tire cover by adjusting the guide-rolls 45, 45 and their flanges 50 and 48, together with the guide-flange 62, as hereinbefore described. He then starts the machine and sets one rivet of the first row in the material. The first rivet having been set, as hereinbefore described, and the driver moved upwardly, together with the rivet carrier, the lever 77 swings forwardly or toward the right (Fig. 1) the hook-shaped feed finger 94 engages the head of the rivet which has been driven and moves said rivet forward the required space between the rivets and pushes said rivet head into the recess 103 in the stop 97. The feed lever 77 is then rocked in the opposite direction, and just before the feed finger 94 arrives at the extreme left of its movement, the cam-shaped finger 101 engages the arm 100 and rocks the rock-shaft 98 to lift the stop 97 from contact with the material and out of the path of the rivet head, which is now to be fed forward. Another rivet is now set and the feeding operation hereinbefore described is repeated, and thus consecutively the rivets are driven to form the first row of rivets 28. The third row of rivets is driven in the same manner, with each rivet of the third row in lateral alinement with the rivets in the first row and the tire cover is placed in proper position to have the rivets driven therein, as hereinbefore described, by moving the lower slide, with the upper slide, and feeding mechanism thereon backwardly and putting the thumb-pin 68 into the hole 66. When the second and fourth rows of rivets are being driven it will be understood that the feeding mechanism and the upper slide are moved toward the right, from the position shown in Fig. 4 to such a position that the thumb-pin 74 may be inserted in the hole 76. This will bring the stop 97 into the proper position to stop the rivets in alinement with the center of the space between the rivets of the first and third rows.

When driving rivets in a long piece of material, such as the cover of a tire, it is evident that a variation in the character of the material and the thickness thereof will make a certain difference in the spacing, so that when the first row of rivets is nearing completion, it may be that the space between the first rivet driven and the last rivet will be greater, or perhaps not so great, as the distance between the rest of the rivets in the row. To overcome this slight inaccuracy, the operator watches the gage finger 110, when the first row is nearly completed, and if said gage finger alines with the center of the first rivet driven, as illustrated in Fig. 4, then he allows the machine to operate without any change. If, however, the gage finger 110 does not point to the center of the first rivet, but rather to the space between two rivets, then the operator lifts the stop 97 from contact with the tire cover and allows the feed finger to feed a greater space between the few remaining rivets that are to be driven in the first row to make up for the error hereinbefore referred to in the spacing. The feed finger will feed the material farther under these circumstances than when the head of the rivet abuts against the stop 97, for the reason that the parts which impart a rocking movement to the lever 77 are so adjusted and the cam 41 so timed and constructed that when the stop 97 is held against the material and is in operation as a stop the head of the rivet will be brought to bear against said stop before the cam 41 has completed its entire throw. Said finger 94 will, of course, stop when the head of the rivet abuts against the stop 97 and the rest of the throw imparted by the cam 41 will be taken up by a slight spring in the different parts connecting said cam with the feed finger 94, but when the stop 97 is removed, as hereinbefore described, from contact with the material, then this spring of the parts will not take place, but the feed finger will be moved to the full extent of its natural throw, and thus the space between the last half dozen rivets in the first row may be slightly increased to make up for the inaccuracy hereinbefore referred to and thus make all of the rivets in the row appear to be of exactly the same distance apart, although the last six or eight may be slightly farther apart than the rest of the rivets in the row, but for the purpose for which this device is intended, such a slight inaccuracy will have no practical bearing upon the value of the completed article.

It will be noted that the gage finger 110 may be adjusted at its outer end longitudinally of the first row of rivets by loosening the bolt by which said gage finger is fastened to the bracket 109, moving the gage finger to the desired position and then tightening said bolt.

Having thus described my invention, what I claim and desire by Letters Patent to secure is:

1. In a machine for setting rivets or the like in sheet material, mechanism for setting a rivet, including a driver, mechanism adapted to feed said sheet material, and means to adjust said feeding mechanism together with said material in opposite directions relatively to said driver.

2. In a machine for setting rivets or the like in sheet material, mechanism for setting a rivet, including a driver, mechanism adapted to feed said sheet material, and means to adjust said feeding mechanism together with said material in opposite directions laterally of said material.

3. In a machine for setting rivets or the like in sheet material, mechanism for setting a rivet including a driver, mechanism adapted to feed said sheet material, and means to adjust said feeding mechanism longitudinally of said material.

4. In a machine for setting a series of rivets or the like in sheet material, mechanism for setting a rivet including a driver, and mechanism adapted to engage each of the rivets in said series consecutively after it has been set in said material and thereby feed said sheet material relatively to said driver and means to adjust said feeding mechanism, together with said material relatively to said driver.

5. In a machine for setting a series of rivets or the like in sheet material, mechanism for setting a rivet including a driver, mechanism adapted to engage each of the rivets in said series consecutively, and a stop adapted to be engaged by each of the rivets in said series consecutively, whereby said sheet material may be fed a predetermined distance relatively to said driver.

6. In a machine for setting a series of rivets or the like in sheet material, mechanism for setting a rivet including a driver, mechanism adapted to engage each of the rivets in said series consecutively and thereby feed said sheet material relatively to said driver, and means to adjust said feeding mechanism relatively to said driver.

7. In a machine for setting a series of rivets or the like in sheet material, mechanism for setting a rivet in said material, including a driver, a lever and a finger pivoted to said lever and adapted to engage each of the rivets in said series consecutively after it has been set in said material and thereby feed said sheet material relatively to said driver and means to adjust said lever and finger relatively to said driver.

8. In a machine for setting rivets or the like in sheet material, mechanism for setting a rivet including a driver, a lever, and a finger pivoted to said lever and adapted to engage each of the rivets in said series consecutively, and a stop adapted to be engaged by each of the rivets in said series consecutively, whereby said sheet material may be fed a predetermined distance relatively to said driver.

9. In a machine for setting rivets or the like in sheet material, mechanism for setting a rivet including a driver, a lever and a finger pivoted to said lever and adapted to engage each of the rivets in said series consecutively, a stop adapted to be engaged by each of the rivets in said series consecutively, whereby said sheet material may be fed a predetermined distance relatively to said driver, and means to move said stop toward and away from said material.

10. In a machine for setting rivets or the like in sheet material, mechanism for setting a rivet including a driver, a lever and a finger pivoted to said lever and adapted to engage each of the rivets in said series consecutively, a rock-shaft, a stop fast to said rock-shaft adapted to be engaged by each of the rivets in said series consecutively, and means to rock said shaft whereby said stop may be moved toward and away from said sheet material.

11. In a machine for setting rivets or the like in sheet material, mechanism for setting a rivet including a driver, mechanism adapted to feed said sheet material, means to adjust said feeding mechanism relatively to said driver, and a presser foot adapted to hold said material stationary while said feeding mechanism is making its backward motion.

12. In a machine for setting rivets or the like in sheet material, mechanism for setting a rivet including a driver, mechanism adapted to feed said sheet material, means to adjust said feeding mechanism relatively to said driver, a presser foot, and a pivot upon which said presser foot is eccentrically mounted, said presser foot adapted to hold said material stationary, while said feeding mechanism is making its backward motion.

13. In a machine for setting rivets or the like in sheet material, mechanism for setting a rivet including a driver, mechanism adapted to feed said sheet material, means to adjust said feeding mechanism relatively to said driver, a presser foot having a curved periphery with serrations thereon adapted to bear against said sheet material, a pivot upon which said presser foot is eccentrically mounted, and a spring acting to hold said serrated periphery in contact with said sheet material.

14. In a machine for setting a series of rivets or the like in sheet material, mechanism for setting a rivet including a driver, mechanism adapted to engage each of the rivets in said series consecutively, and a stop provided with a recess in alinement with said series of rivets and adapted to engage and receive the head of each of said rivets consecutively, whereby said sheet material may be fed a predetermined distance relatively to said driver.

15. In a machine for setting a series of rivets or the like in sheet material, mechanism for setting a rivet including a driver, a lever and a finger pivoted to said lever and adapted to engage each of the rivets in said series consecutively, a rock-shaft, a stop fast to said rock-shaft adapted to be engaged by each of the rivets in said series consecutively, an arm fast to said rock-shaft, and a finger fast to said lever adapted to engage said arm and rock said stop away from said sheet material.

16. In a machine for setting a series of rivets or the like in sheet material, mechanism for setting a rivet including a driver, a lever and a finger pivoted to said lever and adapted to engage each of the rivets in said series consecutively, a rock-shaft, a stop fast to said rock-shaft adapted to be engaged by each of the rivets in said series consecutively, an arm fast to said rock-shaft, a finger fast to said lever adapted to engage said arm and rock said stop away from said sheet material, and a spring adapted to hold said stop against said sheet material.

17. In a machine for setting rivets or the like in sheet material, mechanism for setting a rivet including a driver, mechanism adapted to feed said sheet material, a slide upon which said feeding mechanism is mounted, another slide upon which said first-named slide is mounted, said slides movable in directions at right angles to each other.

18. In a machine for setting rivets or the like in sheet material, mechanism for setting a rivet including a driver, mechanism adapted to feed said sheet material, a slide upon which said feeding mechanism is mounted movable longitudinally of said material, and a second slide movable laterally of said material upon which said first-named slide is movably mounted.

19. In a machine for setting rivets or the like in sheet material, a pair of guide-rolls upon which said sheet material is adapted to rest, mechanism for setting a rivet including a driver, mechanism adapted to feed said sheet material, and means to adjust said feeding mechanism and guide-rolls simultaneously relatively to said driver.

20. In a machine for setting rivets or the like in sheet material, a pair of guide-rolls upon which said sheet material is adapted to rest, mechanism for setting a rivet including a driver, mechanism adapted to feed said sheet material, means to adjust said feeding mechanism and guide-rolls simultaneously relatively to said driver, and means to adjust said guide-rolls independently of said feeding mechanism relatively to said driver.

21. In a machine for setting rivets or the like in sheet material, a pair of guide-rolls upon which said sheet material is adapted to rest, an edge guide for said sheet material, mechanism for setting a rivet including a driver, mechanism adapted to feed said sheet material, and means to adjust said feeding mechanism, guide-rolls and edge guide simultaneously relatively to said driver.

22. In a machine for setting rivets or the like in sheet material, a pair of guide-rolls upon which said sheet material is adapted to rest, an edge guide for said sheet material, mechanism for setting a rivet including a driver, mechanism adapted to feed said sheet material, means to adjust said feeding mechanism, guide rolls and edge guide simultaneously relatively to said driver, and means to adjust said guide rolls and edge guide independently of said feeding mechanism relatively to said driver.

23. In a machine for setting a plurality of rows of rivets or the like in sheet material, mechanism for setting a rivet including a driver, mechanism adapted to engage each of the rivets in the first row of said rivets consecutively and thereby feed said sheet material longitudinally thereof, and means to adjust said feeding mechanism and material laterally of said material, whereby said material may be fed by the rivets of the first row of said rivets during the setting of a subsequent row of rivets.

24. In a machine for setting a plurality of rows of rivets or the like in sheet material, mechanism for setting a rivet including a driver, mechanism adapted to engage each of the rivets in the first row of said rivets consecutively and thereby feed said sheet material longitudinally thereof, means to adjust said feeding mechanism and material laterally of said material, whereby said material may be fed by the rivets of the first row of said rivets during the setting of a subsequent row of rivets, and means to adjust said feeding mechanism longitudinally of said sheet material, whereby the rivets in one row may be driven in said sheet material in lateral alinement with the spaces between the rivets in the rows adjacent thereto.

25. In a machine for setting a row of rivets or the like in sheet material, mechanism for setting a rivet including a driver, mechanism adapted to feed said sheet material, a slide upon which said feeding mechanism is mounted, another slide upon which said first named slide is mounted, said slides movable in directions at right angles to each other, and a gage finger fast to said first named slide and extending therefrom into alinement with said row of rivets.

26. In a machine for setting rivets or the like in sheet material, mechanism, including a driver, for setting a rivet in said material, means adapted to engage said rivet after it has been set in said material and feed said material by said rivet out of alinement with said driver, and means adapted to adjust said feeding means and said material in a direction laterally of said material.

27. In a machine for setting rivets or the like in sheet material, mechanism for setting a rivet, including a driver, mechanism adapted to support and feed said sheet material, and means to adjust said feeding mechanism relatively to said driver.

28. In a machine for setting rivets or the like in sheet material, mechanism for setting a rivet, including a driver, mechanism adapted to support and feed said sheet material, and means to adjust said feeding mechanism and the material supported thereon laterally of said material.

29. In a machine for setting a series of rivets or the like in sheet material, mechanism for setting a rivet in said material including a driver, a lever and a finger pivoted on said lever and adapted to swing about an axis lying in a plane substantially parallel to the face of said sheet material, said finger adapted to engage each of the rivets in said series consecutively after it has been set in said material and thereby feed said material relatively to said driver.

In testimony whereof I have hereunto set my hand in presence of two subscribing witnesses.

ARTHUR R. HAVENER.

Witnesses:
EDNA L. WILSON,
J. WINFIELD PEUGH.